(12) United States Patent
Lettow et al.

(10) Patent No.: US 9,518,188 B2
(45) Date of Patent: Dec. 13, 2016

(54) METHOD OF PRINTING A CONDUCTIVE ARTICLE AND ARTICLES MADE THEREBY

(76) Inventors: John S. Lettow, Washington, DC (US); Christy Martin, Edgewater, MD (US); Dan Scheffer, Frederick, MD (US)

(\*) Notice: Subject to any disclaimer, the term of this patent is extended or adjusted under 35 U.S.C. 154(b) by 0 days.

(21) Appl. No.: 13/885,678

(22) PCT Filed: Nov. 15, 2011

(86) PCT No.: PCT/US2011/060883
§ 371 (c)(1),
(2), (4) Date: Oct. 29, 2013

(87) PCT Pub. No.: WO2012/068182
PCT Pub. Date: May 24, 2012

(65) Prior Publication Data
US 2014/0050903 A1    Feb. 20, 2014

Related U.S. Application Data

(60) Provisional application No. 61/413,974, filed on Nov. 15, 2010, provisional application No. 61/413,968, filed on Nov. 15, 2010.

(51) Int. Cl.
| | | |
|---|---|---|
| *B32B 3/00* | (2006.01) | |
| *C09D 5/24* | (2006.01) | |
| *H01B 1/24* | (2006.01) | |
| *C09D 5/26* | (2006.01) | |
| *B42D 25/29* | (2014.01) | |
| *B41M 7/00* | (2006.01) | |

(52) U.S. Cl.
CPC .......... *C09D 5/24* (2013.01); *B42D 25/29* (2014.10); *C09D 5/26* (2013.01); *H01B 1/24* (2013.01); *B41M 7/00* (2013.01); *B42D 2033/20* (2013.01); *Y10T 428/24851* (2015.01)

(58) Field of Classification Search
CPC ................... C09D 5/24; C09D 5/26
See application file for complete search history.

(56) References Cited

U.S. PATENT DOCUMENTS

2012/0142832 A1\*  6/2012  Varma et al. .................. 524/145

\* cited by examiner

*Primary Examiner* — Elizabeth Mulvaney
(74) *Attorney, Agent, or Firm* — Trentice V. Bolar, Esq.; Kate Redmond

(57) ABSTRACT

A method of printing articles having variable conductivities, including those having conductivity gradients.

20 Claims, 4 Drawing Sheets

METHOD OF PRINTING A CONDUCTIVE ARTICLE AND ARTICLES MADE THEREBY

REFERENCE TO RELATED APPLICATIONS

The present application claims priority to U.S. Provisional Application 61/413,968, filed on Nov. 15, 2010 and U.S. Provisional Application 61/413,974, filed on Nov. 15, 2010, the entire contents of which are hereby incorporated by reference.

FIELD OF THE INVENTION

The present invention relates to a method of printing articles having variable conductivities, including conductivity gradients.

BACKGROUND

Surface coatings can be used to impart articles with desirable properties that are not possessed by the articles themselves or not possessed in a sufficient degree. For example, there are myriad applications for which it would be desirable to use electrically conductive and/or thermally conductive components having good physical properties. Though there are coatings and inks, and other surface treatments (such as metallization) available to impart conductivity to articles, they typically provide only one level of conductivity when used on a given substrate. In order to obtain more than one level of conductivity, it is often necessary to apply several layers or an ink or coating or use multiple different products. It would be desirable in many applications (including many printed electronics) to obtain a method whereby one could obtain a coated/printed article having different conductivity levels in different parts of the article, particularly if it did not require that the article be coated/printed with multiple inks or coatings.

SUMMARY OF THE INVENTION

Disclosed and claimed herein is a method of making a printed article having areas having different conductivities, comprising forming an image on a substrate by applying at least one medium to at least a portion of the substrate and overcoating some or all of the imaged substrate with at least one electrically and/or thermally conductive coating composition. Further disclosed and claimed is a printed article comprising areas having different conductivities, made by forming an image on a substrate by applying at least one medium to at least a portion of the substrate and overcoating some or all of the imaged substrate with at least one electrically and/or thermally conductive coating composition.

DETAILED DESCRIPTION OF THE INVENTION

The printed article of the present invention has different electrical and/or thermal conductivities in different areas of the article.

In the method the present invention, a pattern is formed on (applied to) the surface of a substrate using at least one medium resulting in an image. The image can cover all or some of the surface of the substrate. Un-imaged portions of the substrate are referred to as "background areas". The imaged article may or may not have background areas.

All or part of the substrate including all or part of the image is overcoated with a conductive (as used herein, the terms "conductive" or "conductivity" refer to electrical and/or thermal conductivity) coating composition to give a coated surface and form a printed article (also referred to herein as the "print").

The nature of the image can be varied such that the printed article has different (variable) electrical and/or thermal conductivities in different sections (also referred to as "areas" or "portions") of the print. The conductivities can vary between two or more sections of the image and/or one or more sections of the image and background areas.

Different sections of the printed article may also have differing properties other than conductivities, such as adhesion, flexibility, crease and bend resistance, optical properties (such as optical density, color coordinates, etc.), X-ray diffraction (XRD) patterns, etc.

Some or all of the image can be visible through the coating. In another embodiment, at least a portion or all of the image can be difficult or not possible to detect visually through the coating. The opacity, color coordinates, and other optical properties of the coating and/or the pattern can be adjusted to achieve a desired degree of visibility of the pattern through the coating.

Figure 1A:
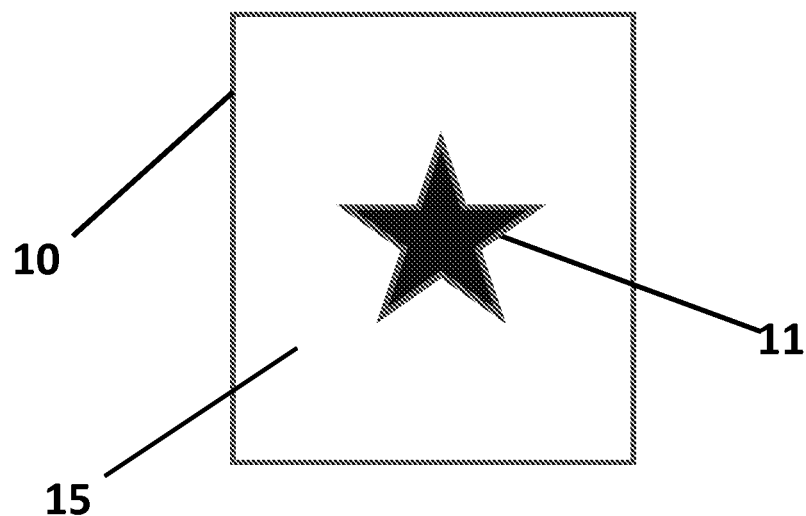
FIG. 1a shows a patterned substrate.
Figure 1B:
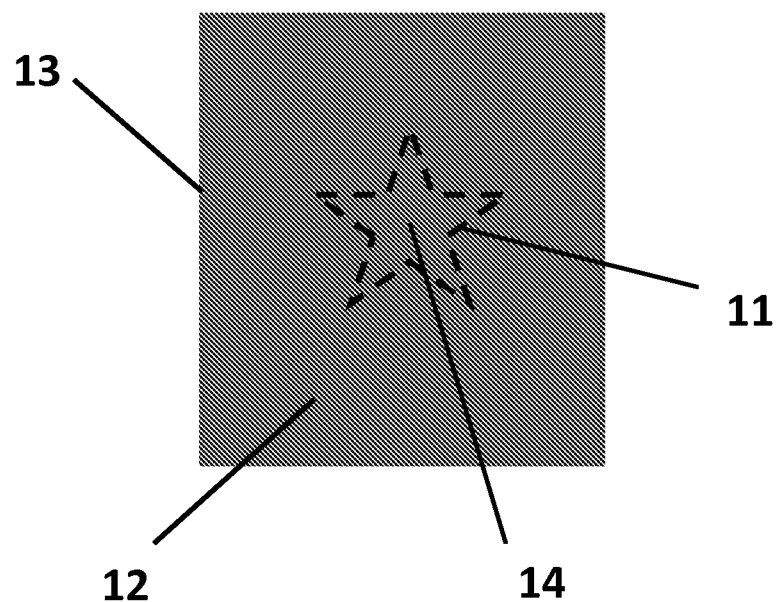
FIG. 1b shows a overcoated patterned substrate.

For example, FIG. 1a shows a patterned substrate 10 that has been imaged with an image 11, leaving a background area 15. FIG. 1b shows a print 13 made by coating the patterned substrate 10 with a conductive coating 12, which also covers image 11. The section 14 of the coating that covers the image 11 has different conductivity from the section of the coating that lies over the background area 15.

The image can be varied in many ways. For example, different sections of the substrate can be imaged with different media and/or different shading, gray scales, dot densities, hues, saturations, etc. of the same or different media. Halftone printing methods may be used to form the image. Different sections can be imaged with variable thicknesses of the same or different media, etc. such that when the image is overcoated, different parts of the print have different conductivities.

Figure 2A:
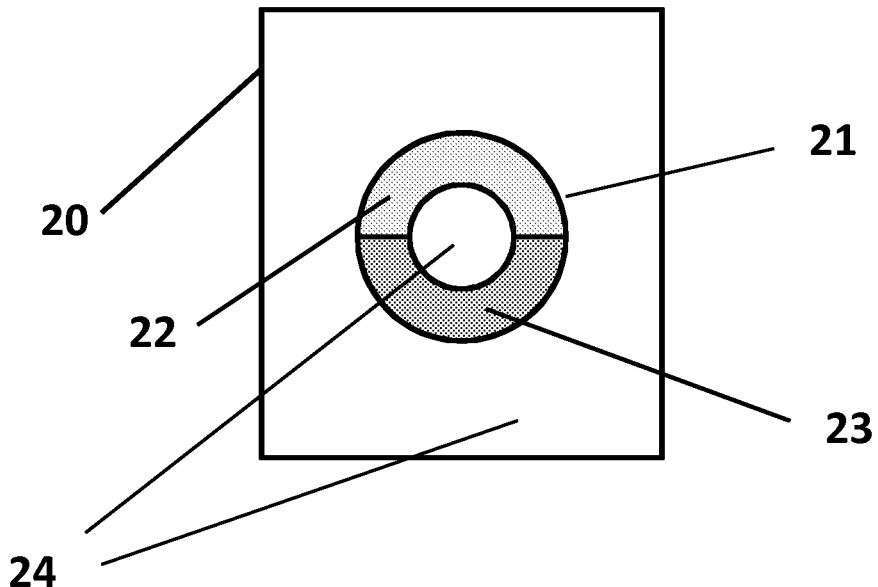
FIG. 2a shows a patterned substrate where the image has two regions, each of which has different properties.

FIG. 2a shows a patterned substrate 20 that has been imaged with image 21, which consists of regions 22 and 23, each of which has different properties. For example, they may have been made using one or more of options listed above. Background area 24 remains uncoated.

Figure 2B:
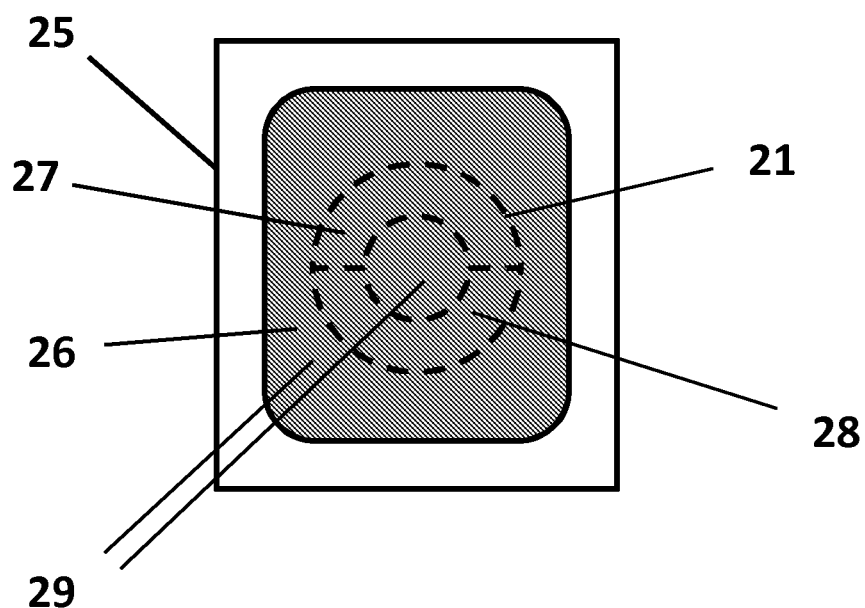
FIG. 2b shows a printed article made by overcoating a patterned substrate where the image has two regions, each of which has different properties.

FIG. 2b shows a print 25 made by overcoating image 21 and a section of the patterned substrate 20 with a coating 26. The section 27 of the coating that covers region 22 and the section 28 that covers region 23 have different conductivities. Furthermore, the section 29 of the coating that covers background areas 24 has a different conductivity from sections 27 and 28.

The printed article may have a gradient of conductivity. For example, the surface of the article may contain a conductivity gradient that is either continuous or nearly-continuous or that occurs in steps. Such a gradient can be obtained by, for example, by applying an image that has increasing or decreasing optical density, gray scale, dot densities, etc. in one or more directions, such as a halftone image. This can be done, by, for example, forming the image by printing onto the substrate using any standard method (including laser printing, ink jet printing, screen printing, offset printing, gravure printing, flexographic printing, etc. using, for example, toner, ink jet inks, halftone inks, etc.) a pattern having an increasing or decreasing percentage of the surface covered by the medium. Typically the image will become visibly darker as more medium (typically ink) is deposited and the image density is increased. When overcoated, the conductivity of those areas of the printed article will vary as a function of the image density. In some cases, the conductivity is lower where the image density is higher.

Figure 3A:
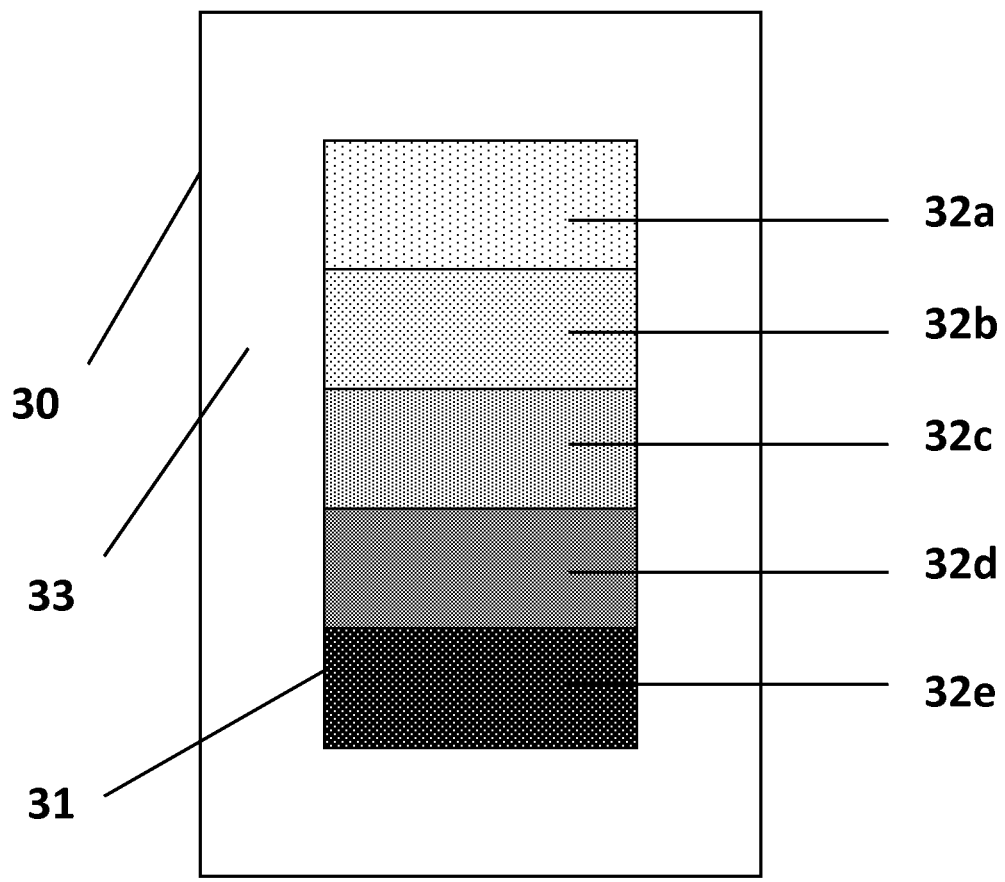
FIG. 3a shows a patterned substrate having sections in different shades of gray.

For example, FIG. 3a shows a patterned substrate 30 that has been imaged with image 31, which consists of sections 32a, 32b, 32c, 32d, and 32e, each of which is printed from the same medium in different shades of gray using, for example, a halftone process. Background area 33 remains uncovered.

Figure 3B:
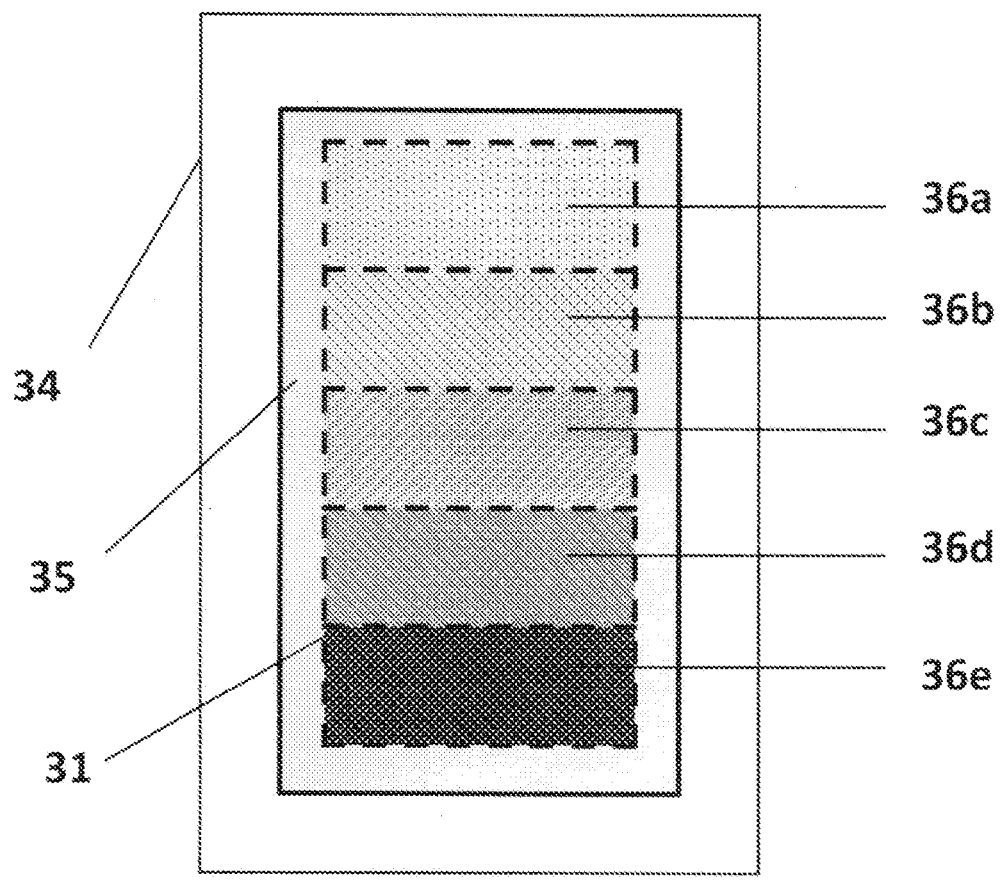
FIG. 3b shows a printed article made by overcoating a patterned substrate having sections in different shades of gray.

FIG. 3b shows a printed article 34 made by overcoating image 31 and a portion of substrate 30 with a coating 35, The overcoated areas 36a, 36b, 36c, 36d, and 36e, which cover sections 32a, 32b, 32c, 32d, and 32e, respectively, have conductivities that increase or decrease in the order 36a, 36b, 36c, 36d, 36e. This is an example of stepwise gradient, and a continuous or nearly continuous gradient can be obtained by overcoating an image where the gray scale (or image density) changes continuously or nearly continuously.

In some embodiments, there will be two coated sections of the printed article having a surface resistivity difference of at least about 5 $\Omega$/square, or at least about 10 $\Omega$/square, or at least 20 $\Omega$/square, or at least about 30 $\Omega$/square, or at least about 50 $\Omega$/square, or at least 100 $\Omega$/square, or at least 250 $\Omega$/square, or at least about 500 $\Omega$/square, or between about 5 and about 1000 $\Omega$/square, or between about 5 and about 250 $\Omega$/square, or between about 5 and about 100 $\Omega$/square, or between about 5 and about 50 $\Omega$/square, or between about 15 and about 1000 $\Omega$/square, or between about 15 and about 250 $\Omega$/square, or between about 15 and about 100 $\Omega$/square, or between about 15 and about 50 $\Omega$/square, or between about 25 and about 1000 $\Omega$/square, or between about 25 and about 250 $\Omega$/square, or between about 25 and about 100 $\Omega$/square, or between about 25 and about 50 $\Omega$/square There are no particular limitations to the form taken by the substrate. Substrates include, but are not limited to, flexible and/or stretchable materials, silicones and other elastomers and other polymeric materials, metals (such as aluminum, copper, steel, stainless steel, etc.), adhesives, fabrics (including cloths) and textiles (such as cotton, wool, polyesters, rayon, etc.), clothing, glasses and other minerals, ceramics, silicon surfaces, wood, paper, cardboard, paperboard, cellulose-based materials, glassine, labels, silicon and other semiconductors, laminates, corrugated materials, concrete, bricks, and other building materials, etc. Substrates can in the form of films, papers, wafers, larger three-dimensional objects, etc.

The substrates can have been treated with other materials before the images are applied. Examples include substrates (such as PET) coated with indium tin oxide, antimony tin oxide, etc. They can be woven, nonwoven, in mesh form; etc.

The substrates can be paper-based materials generally (including paper, paperboard, cardboard, glassine, etc.). Paper-based materials can be surface treated. Examples of surface treatments include coatings such as polymeric coatings, which can include PET, polyethylene, polypropylene, acetates, nitrocellulose, etc. Coatings can be adhesives. The paper based materials can be of sized.

Examples of polymeric materials include, but are not limited to, those comprising thermoplastics and thermosets, including elastomers and rubbers (including thermoplastics and thermosets), silicones, fluorinated polysiloxanes, natural rubber, butyl rubber, chlorosulfonated polyethylene, chlorinated polyethylene, styrene/butadiene copolymers (SBR), styrene/ethylene/butadiene/stryene copolymers (SEBS), styrene/ethylene/butadiene/stryene copolymers grafted with maleic anhydride, styrene/isoprene/styrene copolymers (SIS), polyisoprene, nitrile rubbers, hydrogenated nitrile rubbers, neoprene, ethylene/propylene copolymers (EPR), ethylene/propylene/diene copolymers (EPDM), ethylene/vinyl acetate copolymer (EVA), hexafluoropropylene/vinylidene fluoride/tetrafluoroethylene copolymers, tetrafluoroethylene/propylene copolymers, fluorelastomers, polyesters (such as poly(ethylene terephthalate), poly(butylene terephthalate), poly(ethylene naphthalate), liquid crystalline polyesters, poly(lactic acid), etc.); polystyrene; polyamides (including polyterephthalamides); polyimides (such as Kapton®); aramids (such as Kevlar® and Nomex®); fluoropolymers (such as fluorinated ethylene propylene (FEP), polytetrafluoroethylene (PTFE), poly(vinyl fluoride), poly(vinylidene fluoride), etc.); polyetherimides; poly(vinyl chloride); poly(vinylidene chloride); polyurethanes (such as thermoplastic polyurethanes (TPU); spandex, cellulosic polymers (such as nitrocellulose, cellulose acetate, etc.); styrene/acrylonitriles polymers (SAN); arcrylonitrile/butadiene/styrene polymers (ABS); polycarbonates; polyacrylates; poly(methyl methacrylate); ethylene/vinyl acetate copolymers; thermoset epoxies and polyurethanes; polyolefins (such as polyethylene (including low density polyethylene, high density polyethylene, ultrahigh molecular weight polyethylene, etc.), polypropylene (such as biaxially-oriented polypropylene, etc.); Mylar; etc. They can be non-woven materials, such as DuPont Tyvek®. They can be adhesive or adhesive-backed materials (such as adhesive-backed papers or paper substitutes). They can be mineral-based paper substitutes such as Teslin® from PPG Industries. The substrate can be a transparent or translucent or optical material, such as glass, quartz, polymer (such as polycarbonate or poly(meth)acrylates (such as poly(methyl methacrylate).

Examples of substrates include packaging material, currency, financial instruments, etc.

The pattern and coating composition can be applied using any suitable method, including, but not limited to, painting, coating, printing, pouring, spin casting, solution casting, dip coating, powder coating, by syringe or pipette, spray coating, curtain coating, lamination, co-extrusion, electrospray deposition, ink-jet printing, spin coating, thermal transfer (including laser transfer) methods, doctor blade printing, wire rod printing, screen printing, rotary screen printing, gravure printing, lithographic printing, intaglio printing, digital printing, capillary printing, offset printing, microprinting, electrohydrodynamic (EHD) printing (a method of which is described in WO 2007/053621, which is hereby incorporated herein by reference), flexographic printing, pad printing, stamping, tampon printing, pad printing, stencil, wire rod, xerography, microcontact printing, dip pen nanolithography, laser printing, drawing, writing, coloring, via pen, or similar means, etc. The pattern and/or coating composition can be applied in multiple layers or via multiple passes or multiple methods.

The pattern can be made from any suitable medium including, but not limited to, paints, inks, varnishes, toners and other solid or powder-based printing media, inkjet inks, water-based inks and coatings, solvent based inks and coatings, graphic inks, UV-cured inks, flexographic inks, screen inks, offset inks, gravure inks, pencils and pens, chalk and other minerals, crayons, markers (e.g. felt tip pens, permanent markers, magic markers, highlighters, Sharpies, etc.), waxes, etc. In some embodiments, the media can use carbon-based dyes and/or pigments, colored dyes and/or pigments, materials that are pigment/dye-free, materials that are binder-free, etc. Two or more media can be used and may overlap each other.

The pattern and overcoating may take on any form. They may be continuous or amorphous, in the form of designs, shapes, lines, characters (such as letters, numbers, symbols, etc.), lines, bar codes (including two-dimensional and three-dimensional bar codes, etc.), arbitrary designs and patterns, etc. They can have a uniform or non-uniform thickness. The overcoating may be applied such that it covers some or all of the image and little to none of the background areas.

The coatings comprise one or more conductive components, and optionally, at least one binder, at least one carrier, and other additives.

Examples of electrically and/or thermally conductive components include graphene sheets (which may also be used in conjunction with other electrically conductive components, metals (including metal alloys), conductive metal oxides, polymers, carbonaceous materials other than graphene sheets, metal-coated materials, etc. These components can take a variety of forms, including particles, powders, flakes, foils, needles, etc.

Examples of metals include, but are not limited to silver, silver alloys, copper, copper alloys, aluminum, platinum, palladium, nickel, chromium, gold, bronze, colloidal metals, etc. Examples of metal oxides include antimony tin oxide and indium tin oxide and materials such as fillers coated with metal oxides. Metal and metal-oxide coated materials include, but are not limited to metal coated carbon and graphite fibers, metal coated glass fibers, metal coated glass beads, metal coated ceramic materials (such as beads), etc. These materials can be coated with a variety of metals, including nickel.

Examples of electrically conductive polymers include, but are not limited to, polyacetylene, polyethylene dioxythiophene (PEDOT), poly(styrenesulfonate) (PSS), PEDOT: PSS copolymers, polythiophene and polythiophenes, poly (3-alkylthiophenes), poly(2,5-bis(3-tetradecylthiophen-2-yl)thieno[3,2-b]thiophene) (PBTTT), poly (phenylenevinylene), polypyrene, polycarbazole, polyazulene, polyazepine, polyflurorenes, polynaphthalene, polyisonaphthalene, polyaniline, polypyrrole, poly(phenylene sulfide), copolymers of one or more of the foregoing, etc., and their derivatives and copolymers. The conductive polymers may be doped or undoped. They may be doped with boron, phosphorous, iodine, etc.

Examples of carbonaceous materials other than graphene sheets, but are not limited to, graphite (including natural, Kish, and synthetic, annealed, pyrolytic, highly oriented pyrolytic, etc. graphites), graphitized carbon, carbon black, mesoporous carbon, carbon fibers and fibrils, carbon whiskers, vapor-grown carbon nanofibers, metal coated carbon fibers, carbon nanotubes (including single- and multi-walled nanotubes), fullerenes, activated carbon, carbon fibers, expanded graphite, expandable graphite, graphite oxide, hollow carbon spheres, carbon foams, etc.

Preferred conductive components are graphene sheets. The graphene sheets are graphite sheets preferably having a surface area of from about 100 to about 2630 $m^2/g$. In some embodiments, the graphene sheets primarily, almost completely, or completely comprise fully exfoliated single sheets of graphite (these are approximately 1 nm thick and are often referred to as "graphene"), while in other embodiments, at least a portion of the graphene sheets can comprise at partially exfoliated graphite sheets, in which two or more sheets of graphite have not been exfoliated from each other. The graphene sheets can comprise mixtures of fully and partially exfoliated graphite sheets.

Graphene sheets are distinct from carbon nanotubes. Graphene sheets may have a "platey" (e.g. two-dimensional) structure and do not have the needle-like form of carbon nanotubes. The two longest dimensions of the graphene sheets may each be at least 50 times greater than the shortest dimension (i.e. thickness) of the sheets.

Graphene sheets can be made using any suitable method. For example, they can be obtained from graphite, graphite oxide, expandable graphite, expanded graphite, etc. They can be obtained by the physical exfoliation of graphite, by for example, peeling off sheets graphene sheets. They can be made from inorganic precursors, such as silicon carbide. They can be made by chemical vapor deposition (such as by reacting a methane and hydrogen on a metal surface). They can be made by the reduction of an alcohol, such ethanol, with a metal (such as an alkali metal like sodium) and the subsequent pyrolysis of the alkoxide product (such a method is reported in *Nature Nanotechnology* (2009), 4, 30-33). They can be made by the exfoliation of graphite in dispersions or exfoliation of graphite oxide in dispersions and the subsequently reducing the exfoliated graphite oxide. Graphene sheets can be made by the exfoliation of expandable graphite, followed by intercalation, and ultrasonication or other means of separating the intercalated sheets (see, for example, *Nature Nanotechnology* (2008), 3, 538-542). They can be made by the intercalation of graphite and the subsequent exfoliation of the product in suspension, thermally, etc.

Graphene sheets can be made from graphite oxide (also known as graphitic acid or graphene oxide). Graphite can be treated with oxidizing and/or intercalating agents and exfoliated. Graphite can also be treated with intercalating agents and electrochemically oxidized and exfoliated. Graphene sheets can be formed by ultrasonically exfoliating suspensions of graphite and/or graphite oxide in a liquid (which can contain surfactants and/or intercalants). Exfoliated graphite oxide dispersions or suspensions can be subsequently reduced to graphene sheets. Graphene sheets can also be formed by mechanical treatment (such as grinding or milling) to exfoliate graphite or graphite oxide (which would subsequently be reduced to graphene sheets).

Reduction of graphite oxide to graphene can be by means of chemical reduction and can be carried out in graphite oxide in a solid form, in a dispersion, etc. Examples of useful chemical reducing agents include, but are not limited to, hydrazines (such as hydrazine, N,N-dimethylhydrazine, etc.), sodium borohydride, citric acid, hydroquinone, isocyanates (such as phenyl isocyanate), hydrogen, hydrogen plasma, etc. A dispersion or suspension of exfoliated graphite oxide in a carrier (such as water, organic solvents, or a mixture of solvents) can be made using any suitable method (such as ultrasonication and/or mechanical grinding or milling) and reduced to graphene sheets.

Graphite oxide can be produced by any method known in the art, such as by a process that involves oxidation of graphite using one or more chemical oxidizing agents and, optionally, intercalating agents such as sulfuric acid. Examples of oxidizing agents include nitric acid, sodium and potassium nitrates, perchlorates, hydrogen peroxide, sodium and potassium permanganates, phosphorus pentoxide, bisulfites, etc. Preferred oxidants include $KClO_4$; $HNO_3$ and $KClO_3$; $KMnO_4$ and/or $NaMnO_4$; $KMnO_4$ and $NaNO_3$; $K_2S_2O_8$ and $P_2O_5$ and $KMnO_4$; $KMnO_4$ and $HNO_3$; and $HNO_3$. Preferred intercalation agents include sulfuric acid. Graphite can also be treated with intercalating agents and electrochemically oxidized. Examples of methods of making graphite oxide include those described by Staudenmaier (*Ber. Stsch. Chem. Ges.* (1898), 31, 1481) and Hummers (*J. Am. Chem. Soc.* (1958), 80, 1339).

One example of a method for the preparation of graphene sheets is to oxidize graphite to graphite oxide, which is then thermally exfoliated to form graphene sheets (also known as thermally exfoliated graphite oxide), as described in US patent application publication 2007/0092432, the disclosure of which is incorporated herein by reference. The thusly formed graphene sheets can display little or no signature corresponding to graphite or graphite oxide in their X-ray diffraction pattern.

The thermal exfoliation can be carried out in a continuous, semi-continuous batch, etc. process.

Heating can be done in a batch process or a continuous process and can be done under a variety of atmospheres, including inert and reducing atmospheres (such as nitrogen, argon, and/or hydrogen atmospheres). Heating times can range from under a few seconds or several hours or more, depending on the temperatures used and the characteristics desired in the final thermally exfoliated graphite oxide. Heating can be done in any appropriate vessel, such as a fused silica, mineral, metal, carbon (such as graphite), ceramic, etc. vessel. Heating can be done using a flash lamp.

During heating, the graphite oxide can be contained in an essentially constant location in single batch reaction vessel, or can be transported through one or more vessels during the reaction in a continuous or batch mode. Heating can be done using any suitable means, including the use of furnaces and infrared heaters.

Examples of temperatures at which the thermal exfoliation of graphite oxide can be carried out are at least about 300° C., at least about 400° C., at least about 450° C., at least about 500° C., at least about 600° C., at least about 700° C., at least about 750° C., at least about 800° C., at least about 850° C., at least about 900° C., at least about 950° C., and at least about 1000° C. Preferred ranges include between about 750 and about 3000° C., between about 850 and about 2500° C., between about 950 and about 2500° C., and between about 950 and about 1500° C.

The time of heating can range from less than a second to many minutes. For example, the time of heating can be less than about 0.5 seconds, less than about 1 second, less than about 5 seconds, less than about 10 seconds, less than about 20 seconds, less than about 30 seconds, or less than about 1 min. The time of heating can be at least about 1 minute, at least about 2 minutes, at least about 5 minutes, at least about 15 minutes, at least about 30 minutes, at least about 45 minutes, at least about 60 minutes, at least about 90 minutes, at least about 120 minutes, at least about 150 minutes, at least about 240 minutes, from about 0.01 seconds to about 240 minutes, from about 0.5 seconds to about 240 minutes, from about 1 second to about 240 minutes, from about 1 minute to about 240 minutes, from about 0.01 seconds to about 60 minutes, from about 0.5 seconds to about 60 minutes, from about 1 second to about 60 minutes, from about 1 minute to about 60 minutes, from about 0.01 seconds to about 10 minutes, from about 0.5 seconds to about 10 minutes, from about 1 second to about 10 minutes, from about 1 minute to about 10 minutes, from about 0.01 seconds to about 1 minute, from about 0.5 seconds to about 1 minute, from about 1 second to about 1 minute, no more than about 600 minutes, no more than about 450 minutes, no more than about 300 minutes, no more than about 180 minutes, no more than about 120 minutes, no more than about 90 minutes, no more than about 60 minutes, no more than about 30 minutes, no more than about 15 minutes, no more than about 10 minutes, no more than about 5 minutes, no more than about 1 minute, no more than about 30 seconds, no more than about 10 seconds, or no more than about 1 second. During the course of heating, the temperature can vary.

Examples of the rate of heating include at least about 120° C./min, at least about 200° C./min, at least about 300° C./min, at least about 400° C./min, at least about 600° C./min, at least about 800° C./min, at least about 1000° C./min, at least about 1200° C./min, at least about 1500° C./min, at least about 1800° C./min, and at least about 2000° C./min.

Graphene sheets can be annealed or reduced to graphene sheets having higher carbon to oxygen ratios by heating under reducing atmospheric conditions (e.g., in systems purged with inert gases or hydrogen). Reduction/annealing temperatures are preferably at least about 300° C., or at least about 350° C., or at least about 400° C., or at least about 500° C., or at least about 600° C., or at least about 750° C., or at least about 850° C., or at least about 950° C., or at least about 1000° C. The temperature used can be, for example, between about 750 and about 3000° C., or between about 850 and about 2500° C., or between about 950 and about 2500° C.

The time of heating can be for example, at least about 1 second, or at least about 10 seconds, or at least about 1 minute, or at least about 2 minutes, or at least about 5 minutes. In some embodiments, the heating time will be at least about 15 minutes, or about 30 minutes, or about 45 minutes, or about 60 minutes, or about 90 minutes, or about 120 minutes, or about 150 minutes. During the course of annealing/reduction, the temperature can vary within these ranges.

The heating can be done under a variety of conditions, including in an inert atmosphere (such as argon or nitrogen) or a reducing atmosphere, such as hydrogen (including hydrogen diluted in an inert gas such as argon or nitrogen), or under vacuum. The heating can be done in any appropriate vessel, such as a fused silica or a mineral or ceramic vessel or a metal vessel. The materials being heated including any starting materials and any products or intermediates) can be contained in an essentially constant location in single batch reaction vessel, or can be transported through one or more vessels during the reaction in a continuous or batch reaction. Heating can be done using any suitable means, including the use of furnaces and infrared heaters.

The graphene sheets preferably have a surface area of at least about 100 $m^2/g$ to, or of at least about 200 $m^2/g$, or of at least about 300 $m^2/g$, or of at least about 350 $m^2/g$, or of at least about 400 $m^2/g$, or of at least about 500 $m^2/g$, or of at least about 600 m²/g., or of at least about 700 m²/g, or of at least about 800 m²/g, or of at least about 900 m²/g, or of at least about 700 m²/g. The surface area can be about 400 to about 1100 m²/g. The theoretical maximum surface area can be calculated to be 2630 m²/g. The surface area includes all values and subvalues therebetween, especially including 400, 500, 600, 700, 800, 900, 1000, 1100, 1200, 1300, 1400, 1500, 1600, 1700, 1800, 1900, 2000, 2100, 2200, 2300, 2400, 2500, and 2630 m²/g.

The graphene sheets can have number average aspect ratios of about 100 to about 100,000, or of about 100 to about 50,000, or of about 100 to about 25,000, or of about 100 to about 10,000 (where "aspect ratio" is defined as the ratio of the longest dimension of the sheet to the shortest).

Surface area can be measured using either the nitrogen adsorption/BET method at 77 K or a methylene blue (MB) dye method in liquid solution.

The dye method is carried out as follows: A known amount of graphene sheets is added to a flask. At least 1.5 g of MB are then added to the flask per gram of graphene sheets. Ethanol is added to the flask and the mixture is ultrasonicated for about fifteen minutes. The ethanol is then evaporated and a known quantity of water is added to the flask to re-dissolve the free MB. The undissolved material is allowed to settle, preferably by centrifuging the sample. The concentration of MB in solution is determined using a UV-vis spectrophotometer by measuring the absorption at $\lambda_{max}$=298 nm relative to that of standard concentrations.

The difference between the amount of MB that was initially added and the amount present in solution as determined by UV-vis spectrophotometry is assumed to be the amount of MB that has been adsorbed onto the surface of the graphene sheets. The surface area of the graphene sheets are then calculated using a value of 2.54 m² of surface covered per one mg of MB adsorbed.

The graphene sheets can have a bulk density of from about 0.01 to at least about 200 kg/m³. The bulk density includes all values and subvalues therebetween, especially including 0.05, 0.1, 0.5, 1, 5, 10, 15, 20, 25, 30, 35, 50, 75, 100, 125, 150, and 175 kg/m³.

The graphene sheets can be functionalized with, for example, oxygen-containing functional groups (including, for example, hydroxyl, carboxyl, and epoxy groups) and typically have an overall carbon to oxygen molar ratio (C/O ratio), as determined by elemental analysis of at least about 1:1, or more preferably, at least about 3:2. Examples of carbon to oxygen ratios include about 3:2 to about 85:15; about 3:2 to about 20:1; about 3:2 to about 30:1; about 3:2 to about 40:1; about 3:2 to about 60:1; about 3:2 to about 80:1; about 3:2 to about 100:1; about 3:2 to about 200:1; about 3:2 to about 500:1; about 3:2 to about 1000:1; about 3:2 to greater than 1000:1; about 10:1 to about 30:1; about 80:1 to about 100:1; about 20:1 to about 100:1; about 20:1 to about 500:1; about 20:1 to about 1000:1; about 50:1 to about 300:1; about 50:1 to about 500:1; and about 50:1 to about 1000:1. In some embodiments, the carbon to oxygen ratio is at least about 10:1, or at least about 20:1, or at least about 35:1, or at least about 50:1, or at least about 75:1, or at least about 100:1, or at least about 200:1, or at least about 300:1, or at least about 400:1, or at least about 500:1, or at least about 750:1, or at least about 1000:1; or at least about 1500:1, or at least about 2000:1. The carbon to oxygen ratio also includes all values and subvalues between these ranges.

The graphene sheets can contain atomic scale kinks. These kinks can be caused by the presence of lattice defects in, or by chemical functionalization of the two-dimensional hexagonal lattice structure of the graphite basal plane.

The coating compositions can further comprise graphite (including natural, Kish, and synthetic, annealed, pyrolytic, highly oriented pyrolytic, etc. graphites) and/or graphite oxide. The ratio by weight of graphite and/or graphite oxide to graphene sheets can be from about 2:98 to about 98:2, or from about 5:95 to about 95:5, or from about 10:90 to about 90:10, or from about 20:80 to about 80:20, or from about 30:70 to 70:30, or from about 40:60 to about 90:10, or from about 50:50 to about 85:15, or from about 60:40 to about 85:15, or from about 70:30 to about 85:15.

The amounts of graphene sheets having different C/O ratios, graphite, graphite oxide and/or other additives can be adjusted to obtain a coating having desired properties.

The graphene sheets can comprise two or more graphene powders having different particle size distributions and/or morphologies. The graphite can also comprise two or more graphite powders having different particle size distributions and/or morphologies.

When used, binders can be thermosets, thermoplastics, non-melt processable polymers, etc. Binders can also comprise monomers that can be polymerized before, during, or after the application of the coating to the substrate. Polymeric binders can be crosslinked or otherwise cured after the coating has been applied to the substrate. Examples of polymers include, but are not limited to polyolefins (such as polyethylene, linear low density polyethylene (LLDPE), low density polyethylene (LDPE), high density polyethylene, polypropylene, and olefin copolymers), styrene/butadiene rubbers (SBR), styrene/ethylene/butadiene/styrene copolymers (SEBS), butyl rubbers, ethylene/propylene copolymers (EPR), ethylene/propylene/diene monomer copolymers (EPDM), polystyrene (including high impact polystyrene), poly(vinyl acetates), ethylene/vinyl acetate copolymers (EVA), poly(vinyl alcohols), ethylene/vinyl alcohol copolymers (EVOH), poly(vinyl butyral) (PVB), poly(vinyl formal), poly(methyl methacrylate) and other acrylate polymers and copolymers (such as methyl methacrylate polymers, methacrylate copolymers, polymers derived from one or more acrylates, methacrylates, ethyl acrylates, ethyl methacrylates, butyl acrylates, butyl methacrylates, glycidyl acrylates and methacrylates and the like), olefin and styrene copolymers, acrylonitrile/butadiene/styrene (ABS), styrene/acrylonitrile polymers (SAN), styrene/maleic anhydride copolymers, isobutylene/maleic anhydride copolymers, ethylene/acrylic acid copolymers, poly(acrylonitrile), poly(vinyl acetate) and poly(vinyl acetate) copolymers, poly(vinyl pyrrolidone) and poly(vinyl pyrrolidone) copolymers, vinyl acetate and vinyl pyrrolidone copolymers, polycarbonates (PC), polyamides, polyesters, liquid crystalline polymers (LCPs), poly(lactic acid) (PLA), poly(phenylene oxide) (PPO), PPO-polyamide alloys, polysulphone (PSU), polyetherketone (PEK), polyetheretherketone (PEEK), polyimides, polyoxymethylene (POM) homo- and copolymers, polyetherimides, fluorinated ethylene propylene polymers (FEP), poly(vinyl fluoride), poly(vinylidene fluoride), poly(vinylidene chloride), and poly(vinyl chloride), polyurethanes (thermoplastic and thermosetting), aramides (such as Kevlar® and Nomex®), polytetrafluoroethylene (PTFE), polysiloxanes (including polydimethylenesiloxane, dimethylsiloxane/vinylmethylsiloxane copolymers, vinyldimethylsiloxane terminated poly(dimethylsiloxane), etc.), elastomers, epoxy polymers, polyureas, alkyds, cellulosic polymers (such as nitrocellulose, ethyl cellulose, ethyl hydroxyethyl cellulose, carboxymethyl cellulose, cellulose acetate, cellulose acetate propionates, and cellulose acetate butyrates), polyethers (such as poly(ethylene oxide), poly (propylene oxide), poly(propylene glycol), oxide/propylene oxide copolymers, etc.), acrylic latex polymers, polyester acrylate oligomers and polymers, polyester diol diacrylate polymers, UV-curable resins, etc.

Examples of elastomers include, but are not limited to, polyurethanes, copolyetheresters, rubbers (including butyl rubbers and natural rubbers), styrene/butadiene copolymers, styrene/ethylene/butadiene/styrene copolymer (SEBS), polyisoprene, ethylene/propylene copolymers (EPR), ethylene/propylene/diene monomer copolymers (EPDM), polysiloxanes, and polyethers (such as poly(ethylene oxide), poly(propylene oxide), and their copolymers).

Examples of polyamides include, but are not limited to, aliphatic polyamides (such as polyamide 4,6; polyamide 6,6; polyamide 6; polyamide 11; polyamide 12; polyamide 6,9; polyamide 6,10; polyamide 6,12; polyamide 10,10; polyamide 10,12; and polyamide 12,12), alicyclic polyamides, and aromatic polyamides (such as poly(m-xylylene adipamide) (polyamide MXD,6)) and polyterephthalamides such as poly(dodecamethylene terephthalamide) (polyamide 12,T), poly(decamethylene terephthalamide) (polyamide 10,T), poly(nonamethylene terephthalamide) (polyamide 9,T), the polyamide of hexamethylene terephthalamide and hexamethylene adipamide, the polyamide of hexamethyleneterephthalamide, and 2-methylpentamethyleneterephthalamide), etc. The polyamides may be polymers and copolymers (i.e., polyamides having at least two different repeat units) having melting points between about 120 and 255° C. including aliphatic copolyamides having a melting point of about 230° C. or less, aliphatic copolyamides having a melting point of about 210° C. or less, aliphatic copolyamides having a melting point of about 200° C. or less, aliphatic copolyamides having a melting point of about 180° C. or less, etc. Examples of these include those sold under the trade names Macromelt by Henkel and Versamid by Cognis.

Examples of acrylate polymers include those made by the polymerization of one or more acrylic acids (including acrylic acid, methacrylic acid, etc.) and their derivatives, such as esters. Examples include methyl acrylate polymers, methyl methacrylate polymers, methacrylate copolymers. Examples include polymers derived from one or more acrylates, methacrylates, acrylic acid, methacrylic acid, methyl acrylate, methyl methacrylate, ethyl acrylate, ethyl methacrylate, butyl acrylate, butyl methacrylate, glycidyl acrylate, glycidyl methacrylates, 2-ethylhexyl acrylate, 2-ethylhexyl methacrylate, hydroxyethyl acrylate, hydroxyethyl (meth)acrylate, acrylonitrile, and the like. The polymers may comprise repeat units derived from other monomers such as olefins (e.g. ethylene, propylene, etc.), vinyl acetates, vinyl alcohols, vinyl pyrrolidones, etc. They may include partially neutralized acrylate polymers and copolymers (such as ionomer resins).

Examples of polymers include Elvacite® polymers supplied by Lucite International, Inc., including Elvacite® 2009, 2010, 2013, 2014, 2016, 2028, 2042, 2045, 2046, 2550, 2552, 2614, 2669, 2697, 2776, 2823, 2895, 2927, 3001, 3003, 3004, 4018, 4021, 4026, 4028, 4044, 4059, 4400, 4075, 4060, 4102, etc. Other polymer families include Bynel® polymers (such as Bynel® 2022 supplied by DuPont) and Joncryl® polymers (such as Joncryl® 678 and 682).

Examples of polyesters include, but are not limited to, poly(butylene terephthalate) (PBT), poly(ethylene terephthalate) (PET), poly(1,3-propylene terephthalate) (PPT), poly(ethylene naphthalate) (PEN), poly(cyclohexanedimethanol terephthalate) (PCT)), etc.

The coating compositions optionally comprise one or more carriers in which some or all of the components are dissolved, suspended, or otherwise dispersed or carried. Examples of suitable carriers include, but are not limited to, water, distilled or synthetic isoparaffinic hydrocarbons (such Isopar® and Norpar® (both manufactured by Exxon) and Dowanol® (manufactured by Dow), citrus terpenes and mixtures containing citrus terpenes (such as Purogen, Electron, and Positron (all manufactured by Ecolink)), terpenes and terpene alcohols (including terpineols, including alpha-terpineol), limonene, aliphatic petroleum distillates, alcohols (such as methanol, ethanol, n-propanol, i-propanol, n-butanol, i-butanol, sec-butanol, tert-butanol, pentanols, i-amyl alcohol, hexanols, heptanols, octanols, diacetone alcohol, butyl glycol, etc.), ketones (such as acetone, methyl ethyl ketone, cyclohexanone, i-butyl ketone, 2,6,8,trimethyl-4-nonanone etc.), esters (such as methyl acetate, ethyl acetate, n-propyl acetate, i-propyl acetate, n-butyl acetate, i-butyl acetate, tert-butyl acetate, carbitol acetate, etc.), glycol ethers, ester and alcohols (such as 2-(2-ethoxyethoxy) ethanol, propylene glycol monomethyl ether and other propylene glycol ethers; ethylene glycol monobutyl ether, 2-methoxyethyl ether (diglyme), propylene glycol methyl ether (PGME); and other ethylene glycol ethers; ethylene and propylene glycol ether acetates, diethylene glycol monoethyl ether acetate, 1-methoxy-2-propanol acetate (PGMEA); and hexylene glycol (such as Hexasol™ (supplied by SpecialChem)), dibasic esters (such as dimethyl succinate, dimethyl glutarate, dimethyl adipate), dimethylsulfoxide (DMSO), 1,3-dimethyl-3,4,5,6-tetrahydro-2(1H)-pyrimidinone (DMPU), imides, amides (such as dimethylformamide (DMF), dimethylacetamide, etc.), cyclic amides (such as N-methylpyrrolidone and 2-pyrrolidone), lactones (such as beta-propiolactone, gamma-valerolactone, delta-valerolactone, gamma-butyrolactone, epsilon-caprolactone), cyclic imides (such as imidazolidinones such as N,N'-dimethylimidazolidinone (1,3-dimethyl-2-imidazolidinone)), and mixtures of two or more of the foregoing and mixtures of one or more of the foregoing with other carriers. Solvents can be low- or non-VOC solvents, non-hazardous air pollution solvents, and non-halogenated solvents.

The conductive component(s) (including graphene sheets and graphite, if present), are preferably present in the compositions in about 20 to about 98 weight percent, in about 30 to about 95 weight percent, in about 40 to about 95 weight percent, in about 50 to about 95 weight percent, and in about 70 to about 95 weight percent, based on the total amount of conductive component, and binder, if present.

The compositions can be made using any suitable method, including wet or dry methods and batch, semi-continuous, and continuous methods.

For example, components of the coating compositions, such as one or more of the conductive component(s) (including graphene sheets and graphite, if present), binders, carriers, and/or other components can be processed (e.g., milled/ground, blended, etc. by using suitable mixing, dispersing, and/or compounding techniques and apparatus, including ultrasonic devices, high-shear mixers, ball mills, attrition equipment, sandmills, two-roll mills, three-roll mills, cryogenic grinding crushers, extruders, kneaders, double planetary mixers, triple planetary mixers, high pressure homogenizers, ball mills, attrition equipment, sandmills, horizontal and vertical wet grinding mills, etc. Processing (including grinding) technologies can be wet or dry and can be continuous or discontinuous. Suitable materials for use as grinding media include metals, carbon steel, stainless steel, ceramics, stabilized ceramic media (such as yttrium stabilized zirconium oxide), PTFE, glass, tungsten carbide, etc. Methods such as these can be used to change the particle size and/or morphology of the graphite, graphene sheets, other components, and blends or two or more components.

Components can be processed together or separately and can go through multiple processing (including mixing/blending) stages, each involving one or more components (including blends).

There is no particular limitation to the way in which the conductive component(s) (including graphene sheets and graphite, if present), and other components are processed and combined. For example, the conductive component can be processed into given particle size distributions and/or morphologies separately and then combined for further processing with or without the presence of additional components. Unprocessed conductive component(s) (including graphene sheets and/or graphite) can be combined with processed conductive component(s) and further processed with or without the presence of additional components. Processed and/or unprocessed conductive component(s) (such as graphene sheets and/or processed and/or unprocessed graphite) can be combined with other components, such as one or more binders and then combined with processed and/or unprocessed conductive component(s). Two or more combinations of processed and/or unprocessed conductive component(s) (such as graphene sheets and/or processed and/or unprocessed graphite) that have been combined with other components can be further combined or processed.

In one embodiment, if a multi-chain lipid is used, it is added to the some or all of the conductive component (e.g., graphene sheets (and/or graphite if present)) before processing.

After blending and/or grinding steps, additional components can be added to the compositions, including, but not limited to, thickeners, viscosity modifiers, binders, etc. The compositions can also be diluted by the addition of more carrier.

The compositions can optionally comprise one or more additional additives, such as dispersion aids (including surfactants, emulsifiers, and wetting aids), adhesion promoters, thickening agents (including clays), defoamers and antifoamers, biocides, additional fillers, flow enhancers, stabilizers, crosslinking and curing agents, etc.

Examples of dispersing aids include glycol ethers (such as poly(ethylene oxide), block copolymers derived from ethylene oxide and propylene oxide (such as those sold under the trade name Pluronic® by BASF), acetylenic diols (such as 2,5,8,11-tetramethyl-6-dodecyn-5,8-diol ethoxylate and others sold by Air Products under the trade names Surfynol® and Dynol®), salts of carboxylic acids (including alkali metal and ammonium salts), and polysiloxanes.

Examples of grinding aids include stearates (such as Al, Ca, Mg, and Zn stearates) and acetylenic diols (such as those sold by Air Products under the trade names Surfynol® and Dynol®).

Examples of adhesion promoters include titanium chelates and other titanium compounds such as titanium phosphate complexes (including butyl titanium phosphate), titanate esters, diisopropoxy titanium bis(ethyl-3-oxobutanoate, isopropoxy titanium acetylacetonate, and others sold by Johnson-Matthey Catalysts under the trade name Vertec.

Examples of thickening agents include glycol ethers (such as poly(ethylene oxide), block copolymers derived from ethylene oxide and propylene oxide (such as those sold under the trade name Pluronic® by BASF), long-chain carboxylate salts (such aluminum, calcium, zinc, etc. salts of stearates, oleats, palmitates, etc.), aluminosilicates (such as those sold under the Minex® name by Unimin Specialty Minerals and Aerosil® 9200 by Evonik Degussa), fumed silica, natural and synthetic zeolites, etc.

The compositions can optionally comprise at least one "multi-chain lipid", by which term is meant a naturally-occurring or synthetic lipid having a polar head group and at least two nonpolar tail groups connected thereto. Examples of polar head groups include oxygen-, sulfur-, and halogen-containing, phosphates, amides, ammonium groups, amino acids (including α-amino acids), saccharides, polysaccharides, esters (Including glyceryl esters), zwitterionic groups, etc.

The tail groups can be the same or different. Examples of tail groups include alkanes, alkenes, alkynes, aromatic compounds, etc. They can be hydrocarbons, functionalized hydrocarbons, etc. The tail groups can be saturated or unsaturated. They can be linear or branched. The tail groups can be derived from fatty acids, such as oleic acid, palmitic acid, stearic acid, arachidic acid, erucic acid, arachadonic acid, linoleic acid, linolenic acid, oleic acid, etc.

Examples of multi-chain lipids include, but are not limited to, lecithin and other phospholipids (such as phosphoglycerides (including phosphatidylserine, phosphatidylinositol, phosphatidylethanolamine (cephalin), and phosphatidylglycerol) and sphingomyelin); glycolipids (such as glucosyl-cerebroside); saccharolipids; sphingolipids (such as ceramides, di- and triglycerides, phosphosphingolipids, and glycosphingolipids); etc. They can be amphoteric, including zwitterionic.

The compositions can optionally comprise one or more charged organic compounds. The charged organic compound comprises at least one ionic functional group and one hydrocarbon-based chain. Examples of ionic functional groups include ammonium salts, sulfates, sulphonates, phosphates, carboxylates, etc. If two or more ionic functional groups are present, they can be of the same or different types. The compound can comprise additional functional groups, including, but not limited to hydroxyls, alkenes, alkynes, carbonyl groups (such as carboxylic acids, esters, amides, ketones, aldehydes, anhydrides, thiol, etc.), ethers, fluoro, chloro, bromo, iodo, nitriles, nitrogen containing groups, phosphorous containing groups, silicon containing groups, etc.

After they have been applied to the patterned substrate, if necessary, the coating compositions can be cured using any suitable technique, including drying and oven-drying (in air or another inert or reactive atmosphere), UV curing, IR curing, drying, crosslinking (including free radical crosslinking, electron beam crosslinking, etc.), thermal curing, laser curing, microwave curing or drying, sintering, and the like to form the electrode.

In some embodiments, the curing can be thermal curing and can take place at a temperature of no more than about 135° C., or no more than about 120° C., or no more than about 110° C., or no more than about 100° C., or no more than about 90° C., or no more than about 80° C., or no more than about 70° C.

In some embodiments, sections of coated patterns can have conductivities of at least about $10^{-8}$ S/m. They can have a conductivities of about $10^{-6}$ S/m to about $10^5$ S/m, or of about $10^{-5}$ S/m to about $10^5$ S/m. In other embodiments of the invention, the electrodes have conductivities of at least about 0.001 S/m, of at least about 0.01 S/m, of at least about 0.1 S/m, of at least about 1 S/m, of at least about 10 S/m, of at least about 100 S/m, or at least about 1000 S/m, or at least about 10,000 S/m, or at least about 20,000 S/m, or at least about 30,000 S/m, or at least about 40,000 S/m, or at least about 50,000 S/m, or at least about 60,000 S/m, or at least about 75,000 S/m, or at least about $10^5$ S/m, or at least about $10^6$ S/m.

In some embodiments, the surface resistivities of sections of the coated patterns can be no greater than about 500 Ω/square, or no greater than about 350 Ω/square, or no greater than about 200 Ω/square, or no greater than about 200 Ω/square, or no greater than about 150 Ω/square, or no greater than about 100 Ω/square, or no greater than about 75 Ω/square, or no greater than about 50 Ω/square, or no greater than about 30 Ω/square, or no greater than about 20 Ω/square, or no greater than about 10 Ω/square, or no greater than about 5 Ω/square, or no greater than about 1 Ω/square, or no greater than about 0.1 Ω/square, or no greater than about 0.01 Ω/square, or no greater than about 0.001 Ω/square. Conductivities and surface resistivities are typically measured after the coatings have been cured.

In some embodiments, sections of the coated patterns can have a thermal conductivity of about 0.1 to about 50 W/(m-K), or of about 0.5 to about 30 W/(m-K), or of about 1 to about 30 W/(m-K), or of about 1 to about 20 W/(m-K), or of about 1 to about 10 W/(m-K), or of about 1 to about 5 W/(m-K), or of about 2 to about 25 W/(m-K), or of about 5 to about 25 W/(m-K).

The coating compositions can be applied to the patterned substrate using any suitable method, including those described above for the application of the pattern to the substrate. The print can be covered in whole or in part with additional material, such as overcoatings, varnishes, polymers, paper, fabrics, etc. The print can be part of a laminate or multilayered structure.

The coatings can have a variety of thicknesses. For example, the coating can optionally have a thickness of at least about 2 nm, or at least about 5 nm. In various embodiments, the coatings can optionally have a thickness of about 2 nm to 2 mm, about 5 nm to 1 mm, about 2 nm to about 100 nm, about 2 nm to about 200 nm, about 2 nm to about 500 nm, about 2 nm to about 1 micrometer, about 5 nm to about 200 nm, about 5 nm to about 500 nm, about 5 nm to about 1 micrometer, about 5 nm to about 50 micrometers, about 5 nm to about 200 micrometers, about 10 nm to about 200 nm, about 50 nm to about 500 nm, about 50 nm to about 1 micrometer, about 100 nm to about 10 micrometers, about 1 micrometer to about 2 mm, about 1 micrometer to about 1 mm, about 1 micrometer to about 500 micrometers, about 1 micrometer to about 200 micrometers, about 1 micrometer to about 100 micrometers, about 50 micrometers to about 1 mm, about 100 micrometers to about 2 mm, about 100 micrometers to about 1 mm, about 100 micrometers to about 750 micrometers, about 100 micrometers to about 500 micrometers, about 500 micrometers to about 2 mm, about 500 micrometers to about 1 mm, about 500 nm to about 100 micrometers, about 750 nm to about 50 micrometers, about 1 micrometer to about 50 micrometers, about 500 nm to about 100 micrometers, about 750 nm to about 100 micrometers, about 1 micrometer to about 100 micrometers, about 1 micrometer to about 25 micrometers, about 1 micrometer to about 13 micrometers, about 1 micrometer to about 10 micrometers, about 1 micrometer to about 8 micrometers, about 1 micrometer to about 5 micrometers, about 500 nm to about 25 micrometers, about 500 nm to about 13 micrometers, about 500 nm to about 10 micrometers, about 500 nm to about 8 micrometers, or about 500 nm to about 5 micrometers.

The method of the invention can be use to rapidly and flexibly generate conductive patterns. For example, a design generated on a computer could be printed on a standard laser or inkjet printer and the resulting printout coated with the coating composition.

The method can be used to make films or lines, patterns, letters, numbers, circuitry, logos, identification tags, and other shapes and forms.

The printed articles can be used to make fabrics having electrical and thermal conductivity and in solar cell applications; solar energy capture applications; signage, flat panel displays; flexible displays, including light-emitting diode, organic light-emitting diode, and polymer light-emitting diode displays; backplanes and frontplanes for displays; and lighting, including electroluminescent and OLED lighting. The displays can be used as components of portable electronic devices, such as computers, cellular telephones, games, GPS receivers, personal digital assistants, music players, games, calculators, artificial "paper" and reading devices, etc.

They can be used in the manufacture of housings, antennas, and other components of portable electronic devices, such as computers, cellular telephones, games, navigation systems, personal digital assistants, music players, games, calculators, radios, artificial "paper" and reading devices, etc.

The method can be used to form thermally conductive channels on substrates or to form membranes having desired flow properties and porosities. Such materials could have highly variable and tunable porosities and porosity gradients can be formed. The method can be used to form articles having anisotropic thermal and/or electrical conductivities.

The printed articles can be used in printed electronic devices (also referred to as "printed electronics") that can be in the form of complete devices, parts or sub elements of devices, electronic components, etc.

The printed electronic devices can take on a wide variety of forms and be used in a large array of applications. They can contain multiple layers of electronic components (e.g. circuits) and/or substrates. All or part of the image layer(s) can be covered or coated with another material such as a cover coat, varnish, cover layer, cover films, dielectric coatings, electrolytes and other electrically conductive materials, etc. Layers can include semiconductors, metal foils, dielectric materials, etc.

The printed electronics can further comprise additional components, such as processors, memory chips, other microchips, batteries, resistors, diodes, capacitors, transistors, etc.

Other applications include, but are not limited to: passive and active devices and components; electrical and electronic circuitry, integrated circuits; flexible printed circuit boards; transistors; field-effect transistors; microelectromechanical systems (MEMS) devices; microwave circuits; antennas; diffraction gratings; indicators; chipless tags (e.g. for theft deterrence from stores, libraries, etc.); security and theft deterrence devices for retail, library, and other settings; key pads; smart cards; sensors; liquid crystalline displays (LCDs); signage; lighting; flat panel displays; flexible displays, including light-emitting diode, organic light-emitting diode, and polymer light-emitting diode displays; backplanes and frontplanes for displays; electroluminescent and OLED lighting; photovoltaic devices, including backplanes; product identifying chips and devices; membrane switches, batteries, including thin film batteries; electrodes; indicators; printed circuits in portable electronic devices (for example, cellular telephones, computers, personal digital assistants, global positioning system devices, music players, games, calculators, etc.); electronic connections made through hinges or other movable/bendable junctions in electronic devices such as cellular telephones, portable computers, folding keyboards, etc.); wearable electronics; and circuits in vehicles, medical devices, diagnostic devices, instruments, etc.

The electronic devices can be radiofrequency identification (RFID) devices and/or components thereof and/or radiofrequency communication device. Examples include, but are not limited to, RFID tags, chips, and antennas. The RFID devices can be ultrahigh frequency RFID devices, which typically operate at frequencies in the range of about 868 to about 928 MHz. Examples of uses for RFIDs are for tracking shipping containers, products in stores, products in transit, and parts used in manufacturing processes; passports; barcode replacement applications; inventory control applications; pet identification; livestock control; contactless smart cards; automobile key fobs; etc.

The electronic devices can also be elastomeric (such as silicone) contact pads and keyboards. Such devices can be used in portable electronic devices, such as calculators, cellular telephones, GPS devices, keyboards, music players, games, etc. They can also be used in myriad other electronic applications, such as remote controls, touch screens, automotive buttons and switches, etc.

The printed articles can be used for scratch-off products, such as lottery tickets, game cards, gift cards, phone cards, etc. It can be used in anti-fraud, anti-tampering, anti-counterfeiting, anti-theft, tracking, forensics, authentication (including product authentication), etc. applications.

It can be used as part of the operation of security devices, such as those used in financial applications, such as checks, money orders, banknotes, stock certificates, bearer bonds, and other instruments, passports, drivers' licenses, and identification cards, social security cards, motor vehicle registrations, postage stamps, tax stamps, security paper, certificates of authenticity, legal documents, vital records certificates (e.g., birth, death, marriage, etc. records), automobile and land titles, permits, election documents, health records, transcripts, prescription forms, parking and mass transit passes and permits, secure letterhead, warranties and guarantees, coupons and rebates, bills of lading and other shipping documents, lottery tickets, game cards, gift cards, gift certificates, scratch-off cards, loyalty cards, phone cards, credit/debit cards, smart cards, event tickets, etc. It can be incorporated into copy-proof documents.

The security devices can contain barcode (including two- and three-dimensional barcode) information. They can contain identification information.

The printed articles can be used in packaging, including pharmaceutical and food-related packaging applications and applications where tamper-resistant and tamper-evident packaging is needed. It can be used to secure shipments, etc. It can be used with valuables such as art, collectibles, electronics, designer goods, etc. It can be used for brand protection.

A desired feature (lottery numbers, security code, gift card or phone code, bar code, etc.) could be formed on substrate and coated. The coating could then be removed by the user to reveal the underlying feature. The conductivity of the feature could also be read to confirm its authenticity. Similarly, the printed articles could be used to make security devices, where a user would remove coating to reveal an underlying feature that confirms authenticity, contains information, etc. The coating could be simple to remove using tape, scratching, rubbing, etc. If the coating and imaging agent were designed such that the presence of the image under the coating were difficult to detect, the very presence of the security device would be unknown to the uninitiated. The articles can be used for a conductivity-based bar codes.

The printed articles can be used as heaters for apparel, medical applications, outdoor gear, tents, etc.

The articles can be used for electroluminescent devices. The variable conductivity (such as the conductivity gradient) of the articles can affect the photoresponse of these devices allow for an intensity scale and the formation of darker and lighter images on the same device.

They may be used as static templates for photoresists. The may be used to select particles by size using a charged surface having a conductivity gradient. They may be used as a template to deposit powders in varying thicknesses by electrostatic attraction according to the electrical conductivity of the various areas of the articles.

EXAMPLES

An image consisting of a stepwise gradient of six adjoining blocks corresponding to about 5, 20, 40, 60, 80, and 100% gray is printed using a laser printer onto plain printer paper. The six blocks and unimaged sections of the paper sheet are overcoated with a coating comprising graphene sheets, graphite, an acrylate binder, and solvent using a #28 wire rod. The coated paper is dried at about 125° C. for about 4 minutes. The surface resistivities of each block as well as sections of the paper that are not printed with toner (indicated as 0% gray) are measured using a four-point probe. The results are given in Table 1. The degree of coating adhesion to the substrate is directly proportional to the percentage gray on the image.

TABLE 1

| % Gray | Surface resistivity (Ohm/sq) |
|---|---|
| 0 | 20 |
| 5 | 26 |
| 20 | 30 |
| 40 | 42 |
| 60 | 57 |
| 80 | 60 |
| 100 | 67 |

The invention claimed is:

1. A method of making a printed article having areas having different conductivities, comprising forming an image on a substrate by applying at least one medium to at least a portion of the substrate and overcoating some or all of the imaged substrate with at least one electrically and/or thermally conductive coating composition.

2. The method of claim 1, wherein the overcoating is applied to at least one portion of the substrate on which the image has been formed and at least one portion of the substrate on which no image has been formed, such that the at least one overcoated portion of the image has a different electrical and/or thermal conductivity from the at least one overcoated area of the substrate on which no image has been formed.

3. The method of claim 1, wherein the image is formed using two or more media and at least a portion of the image formed from each of the media is overcoated.

4. The method of claim 1, wherein the medium is applied in different thicknesses on different portions of the substrate to form an image and at least two portions of an image having different thicknesses are overcoated.

5. The method of claim 1, wherein the coating composition is electrically conductive.

6. The method of claim 1, wherein the coating composition is thermally conductive.

7. The method of claim 1, wherein the coating composition comprises graphene sheets.

8. The method of claim 1, wherein the coating composition further comprises at least one binder.

9. The method of claim 1, wherein the coating composition further comprises at least one carrier.

10. The method of claim 7, wherein the coating composition further comprises graphite.

11. The method of claim 8, wherein the binder is one or more selected from the group consisting of acrylate polymers, epoxies, polyurethanes, polyamides, poly(vinyl butyral), poly(vinyl pyrrolidone), poly(vinyl acetate), vinyl acetate and vinyl pyrrolidone copolymers, poly(lactic acid), cellulosic polymers, polycarbonates, polyolefins, and polysiloxanes.

12. The method of claim 7, wherein the graphene sheets have a surface area of at least about 100 $m^2/g$.

13. The method of claim 7, wherein the graphene sheets have a surface area of at least about 300 $m^2/g$.

14. The method of claim 7, wherein the graphene sheets have a surface area of at least about 400 $m^2/g$.

15. The method of claim 7, wherein the graphene sheets have a carbon to oxygen ratio of at least about 20:1.

16. The method of claim 7, wherein the graphene sheets have a carbon to oxygen ratio of at least about 75:1.

17. The method of claim 1, wherein the coating composition comprises one or more conductive components selected from the group consisting of silver, silver alloys, copper, copper alloys, carbon black, graphite, and carbon nanotubes.

18. A printed article comprising areas having different conductivities, made by forming an image on a substrate by applying at least one medium to at least a portion of the substrate and overcoating some or all of the imaged substrate with at least one electrically and/or thermally conductive coating composition.

19. The article of claim 18, wherein the coating composition comprises graphene sheets.

20. An electroluminescent device comprising the article of claim 19.

* * * * *